B. W. SMITH.
COOKING RANGE.
APPLICATION FILED NOV. 25, 1910.
1,007,397.
Patented Oct. 31, 1911.
4 SHEETS—SHEET 2.
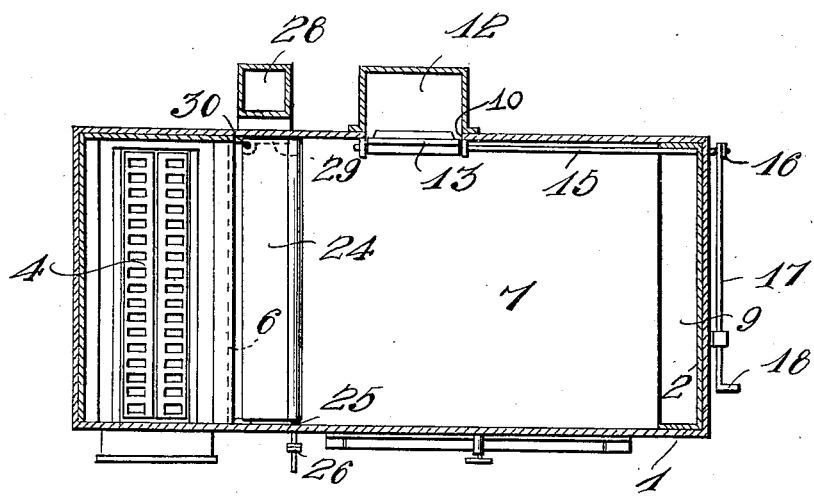
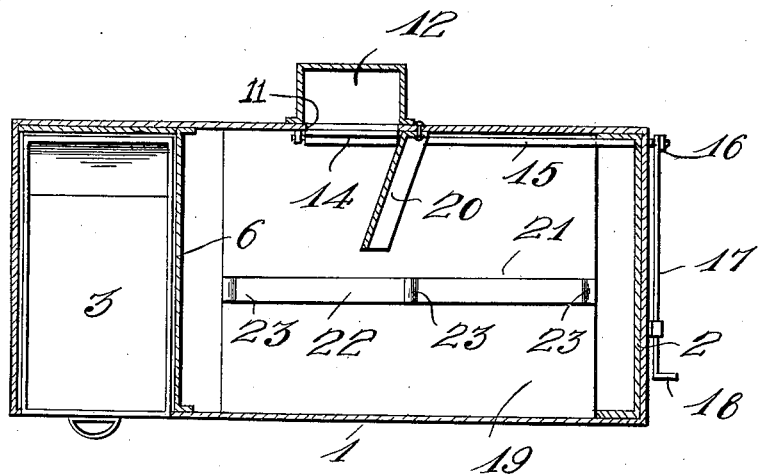
Witnesses
C. R. Hardy
D. B. Hopkins
Inventor
B. W. Smith
by H. B. Willson & Co.
Attorneys B. W. SMITH.
COOKING RANGE.
APPLICATION FILED NOV. 25, 1910.
1,007,397.
Patented Oct. 31, 1911.
4 SHEETS—SHEET 3.
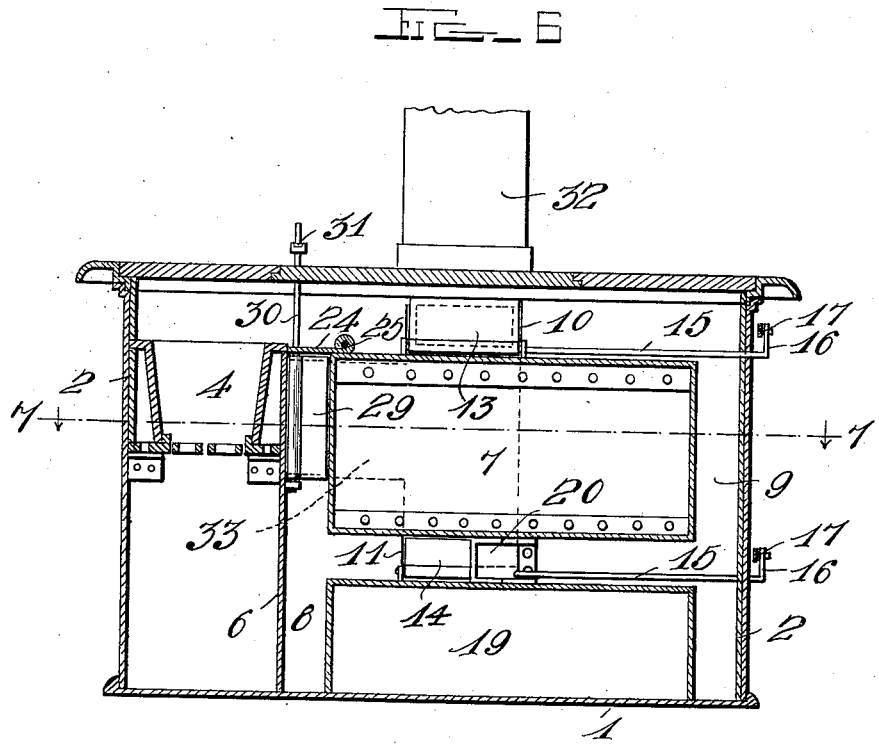
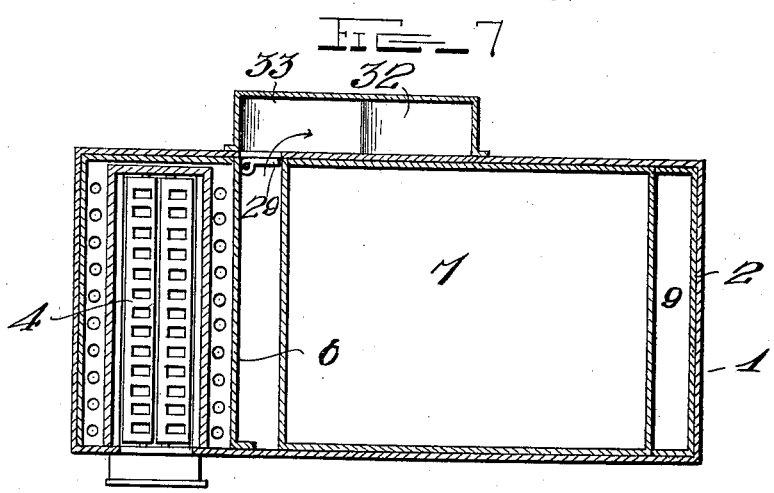
Witnesses
C. P. Hardy
O. B. Hopkins.
Inventor
B. W. Smith
by H. B. Willson & Co.
Attorneys B. W. SMITH.
COOKING RANGE.
APPLICATION FILED NOV. 25, 1910.
1,007,397.
Patented Oct. 31, 1911.
4 SHEETS—SHEET 4.
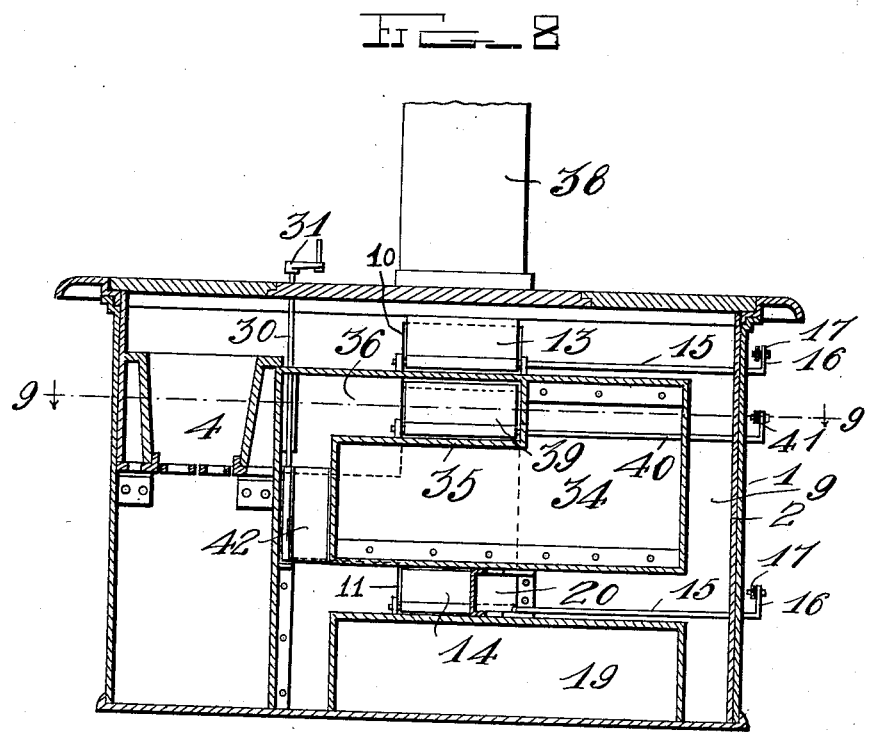
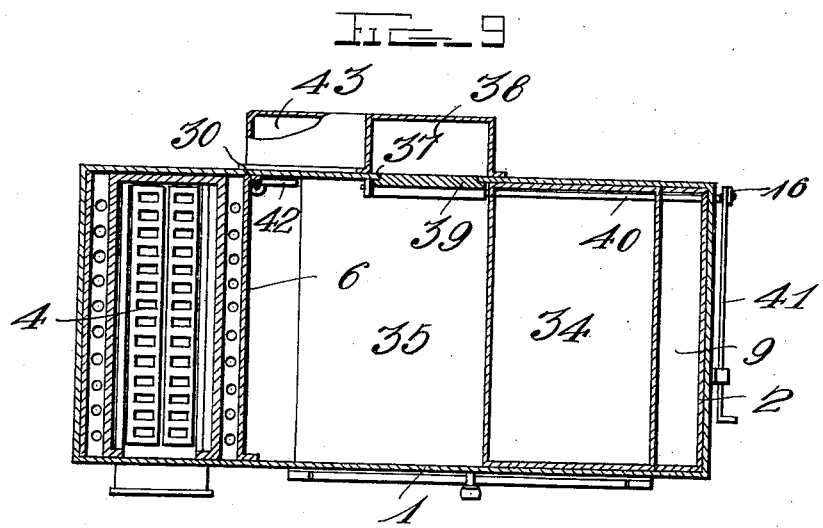
Witnesses
C. P. Hardy
O. B. Hopkins
Inventor
B. W. Smith
by H. B. Willson & Co.
Attorneys
COLUMBIA PLANOGRAPH CO., WASHINGTON, D. C.

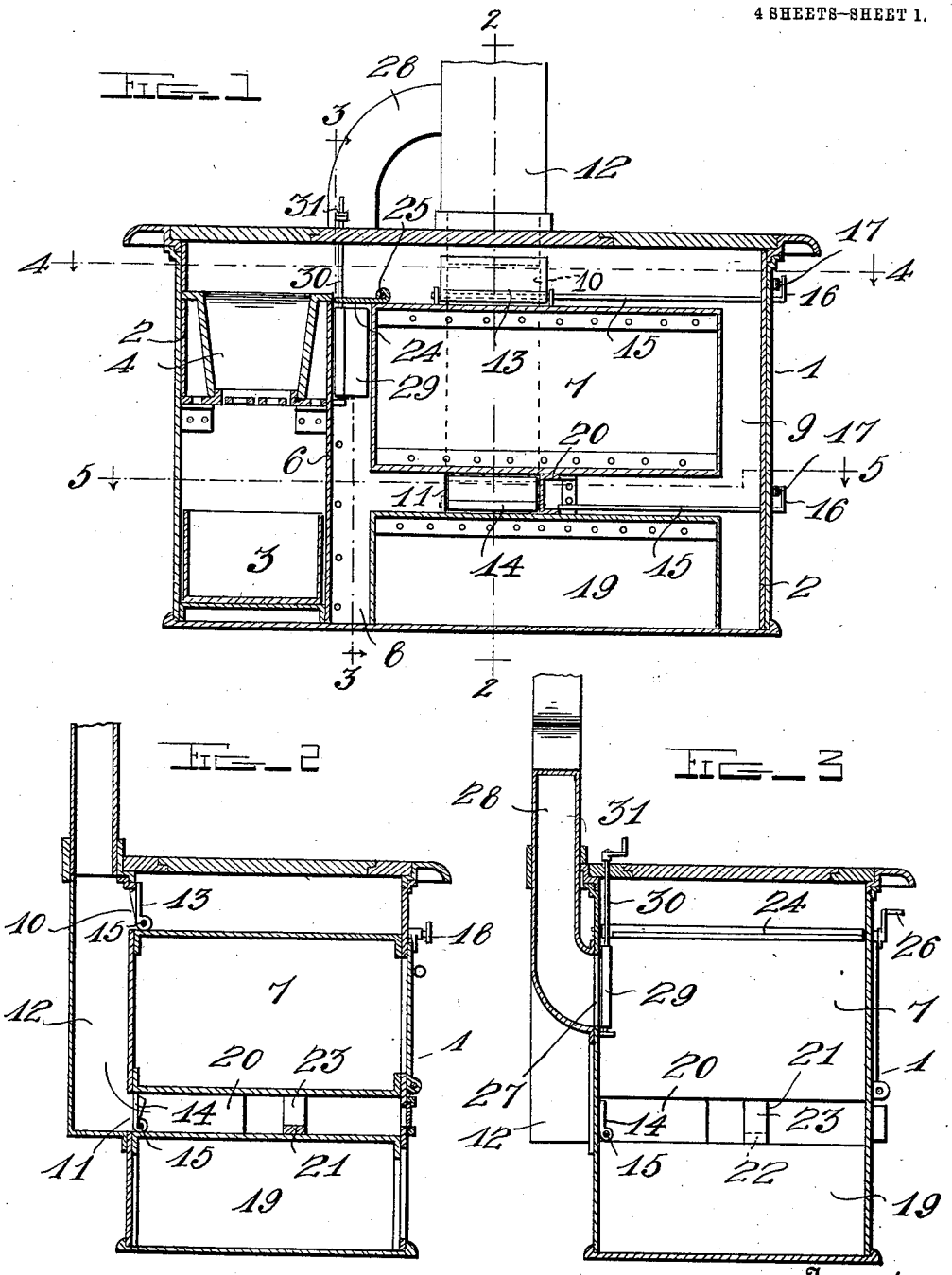

UNITED STATES PATENT OFFICE.

BENJAMIN W. SMITH, OF LACROSSE, VIRGINIA.

COOKING-RANGE.

1,007,397. Specification of Letters Patent. Patented Oct. 31, 1911.

Application filed November 25, 1910. Serial No. 594,101.

*To all whom it may concern:*

Be it known that I, BENJAMIN W. SMITH, a citizen of the United States, residing at Lacrosse, in the county of Mecklenburg and State of Virginia, have invented certain new and useful Improvements in Cooking-Ranges; and I do declare the following to be a full, clear, and exact description of the invention, such as will enable others skilled in the art to which it appertains to make and use the same.

My invention relates to stoves and ranges of the type shown in Letters-Patent #949203, granted to me February 15, 1910, and the object of the present improvements is to provide more perfect control of the course of the heat currents around the oven so that the oven will be more uniformly and rapidly heated than heretofore.

The invention also seeks to improve the construction of the oven and other incidental objects of the invention will appear from the description hereinafter given.

The objects of the invention are attained in the use of the devices illustrated in the accompanying drawings and the invention consists in certain novel features of the same which will be hereinafter first fully described and then more particularly pointed out in the appended claims.

In the annexed drawings, Figure 1 is a vertical longitudinal section of a range constructed in accordance with my present invention. Fig. 2 is a transverse vertical section of the same on the line 2—2 of Fig. 1. Fig. 3 is a similar view taken on the line 3—3 of Fig. 1. Fig. 4 is a horizontal section taken on the line 4—4 of Fig. 1. Fig. 5 is a horizontal section taken on the line 5—5 of Fig. 1. Fig. 6 is a vertical longitudinal section, showing a slight modification. Fig. 7 is a horizontal section taken on the line 7—7 of Fig. 6. Fig. 8 is a central vertical longitudinal section showing a further modification. Fig. 9 is a horizontal section taken on the line 9—9 of Fig. 8.

In carrying out my present invention I employ a casing 1 which may be provided with an asbestos or other heat resisting lining 2 and contains at one end an ashpit 3 and a grate or fire-box 4 which may be of any preferred form. Adjacent the ashpit and the fire-box is arranged a transverse partition 6 and the oven 7 is disposed between the partition 6 and the opposite end of the casing and is spaced from both as indicated at 8 and 9. The rear wall of the casing is provided with openings 10 and 11 which lead into a smoke flue 12 extending to the chimney or other outlet for the products of combustion. In the openings 10 and 11 are disposed dampers 13 and 14 respectively which may be manipulated to cover the said openings or uncover the same so that the smoke and other products of combustion may pass directly from the fire-box to the smoke flue 12 or may be caused to pass around the oven before being admitted to the said smoke flue as will be readily understood. The dampers are each equipped with or mounted upon a rock shaft 15 which extends to the end of the casing and is there provided with a crank arm 16 to which is connected an operating rod 17 extending to the front of the range and provided with a suitable handle 18, as will be readily understood. The oven is so located that a free air flue or passage will be provided between the top of the same and the top of the range, between the ends of the oven and the end of the range and the partition 6 respectively, and also between the bottom of the oven and the bottom or base section 19 of the range. Upon the base section 19 is a deflector 20 which is located immediately adjacent the opening 11 and the damper 14 controlling the same and serves not only to throw the heated currents away from the opening 11 so as to prevent the rapid escape of all the heated air through the said opening, but also to aid in supporting the oven and preventing the collapse of the bottom thereof through the expansion due to its continuous heating. In order to further support the oven and prevent the buckling of the bottom thereof, I employ a bracket or support 21 consisting of a brace or bar 22 secured upon the top of the base member 19 of the range and provided at its ends and at one or more intermediate points of its length with lugs or short standards 23 rising to the bottom of the oven as clearly shown and as will be readily understood.

In carrying out my present invention, the passage between the front end of the oven and the transverse partition 6 is made considerably wider than in my above-mentioned patent and at the upper end of said passage I provide a damper 24 which may be adjusted to extend across the said passage to prevent the currents of heated air escaping upwardly therefrom or may be open to permit the same to perform a continuous cycle of circulation around the four sides of the oven. The damper 24 is fixed to a rock shaft 25 which is mounted in the walls of the casing 1 and is provided at one end with a suitable handle or crank 26 by means of which the damper may be adjusted. The rear wall of the casing is provided with an opening 27 immediately below the damper 24 and communicating with the passage 8 and leading directly into a branch flue 28 which extends into the main smoke flue 12, as clearly shown in Fig. 1. The passage of the air currents through the opening 27 is controlled by a damper 29 which is disposed within the passage 8 immediately adjacent the said opening 27 and is provided with a rock shaft 30 provided at its upper end with a crank or handle 31 by means of which it may be manipulated.

From the foregoing description taken in connection with the accompanying drawings it will be seen that I have provided for a complete and perfect control of the circulation of the currents of heated air from the fire-box around the oven so that the entire body of the oven will be heated and the desired temperature of the same quickly attained. When the fire is started the damper 13 will be swung forwardly and downwardly to uncover the opening 10 and all the other dampers will be closed. The products of combustion will then pass from the fire-box directly into the smoke flue 12 and thence escape through the chimney. After the smoke and soot have been carried off, the damper 13 is closed and the other dampers opened according to the nature of the cooking to be done in the oven. If the damper 14 be opened, a large portion of the heat will escape through the opening 11 into the smoke flue and consequently the oven will be slowly heated, whereas, if the said damper 14 be closed and the damper 24 be opened the heated air may circulate continuously around the oven so that the four sides of the same will be uniformly heated and a high temperature maintained therein. Should the damper 24 be closed and the damper 29 opened, the currents of hot air will then pass around the oven and escape through the opening 27 into the branch flue 28 and thence pass off through the chimney so that while the heating of the oven will be uniform a very high temperature will not be obtained as quickly as in the previously described arrangement of dampers. It will thus be seen that the cook has perfect control over the heat of the oven and may regulate the temperature of the same to a nicety according to the requirements of the particular food being cooked. The construction is simple and the range may be placed upon the market at a cost which will be slight compared with the manifest advantages to be derived from the use of the range.

In Figs. 6 and 7 I have shown a modification of the range in which the smoke flue 32 is constructed with a branch 33 leading toward the end of the range containing the fire-box and opening directly into the side of the main flue as clearly shown. The front end of the branch flue opens into the space 8 of the range and is controlled by the damper 29 exactly as the branch 28 shown in Figs. 1 and 3 is controlled. In this form of the invention, the arrangement of the dampers is exactly the same as in the previously described form but the construction of the smoke flue is such as to bring all the parts of the same below the top of the range and, consequently, the range will present a more sightly appearance than that previously described. The products of combustion will also be carried more directly to the smoke flue after passing entirely around the oven than in the first described form of the invention.

In Figs. 8 and 9 I have shown a further modification of the invention in which the oven 34 is given a stepped formation in its front end, as shown at 35, so as to provide a supplemental flue 36 below the flue leading from the fire-box and communicating with the passage between the end of the oven and the transverse partition as clearly shown in Fig. 8. The provision of this supplemental flue 36 permits the hot currents to pass completely around the oven and be brought back to the plane of the main smoke flue before escaping so that the heat given out by the same may be utilized to the fullest possible extent. The supplemental flue 36 leads to an opening 37 in the back wall of the casing of the range which opening leads directly into the smoke flue 38 as will be readily understood. This opening 37 is controlled by a damper 39 provided with a rock shaft 40 and operating handle 41 as illustrated and as will be readily understood. In this form of the invention the damper 42 corresponds to the damper 29 in the before described forms but is so located as to occupy a plane between the planes of the bottom of the oven and the bottom of the fire-box as shown most clearly in Fig. 8 and this damper 42 may be manipulated to permit the passage of the heated currents into a branch flue 43 leading directly into the smoke flue 38 as shown.

Having thus described my invention, what I claim is:

1. A range comprising a casing, a fire box in one end thereof, an oven supported in the casing and spaced therefrom and from the fire box forming a passageway around the oven, a smoke flue leading from the casing and communicating with said passageway above and below the oven, a branch flue leading to said smoke flue from the space between the fire box and the oven, and dampers controlling the openings into the main smoke flue and the said branch flue.

2. A range comprising a casing, a fire-box in one end of the casing, an oven within the casing spaced therefrom and from the fire-box forming a passageway around the oven, a smoke flue communicating with the spaces above and below the oven, a branch flue leading from the smoke flue toward the fire-box and communicating with the space between the oven and the fire box, dampers above and below the oven controlling the admission to the smoke flue, a damper within the space between the oven and the fire-box controlling the admission to the branch flue, and a damper at the top of the oven and adapted to cover the space between the same and the fire-box.

In testimony whereof I have hereunto set my hand in presence of two subscribing witnesses.

BENJAMIN W. SMITH.

Witnesses:
L. O. HILTON,
O. B. HOPKINS.

Copies of this patent may be obtained for five cents each, by addressing the "Commissioner of Patents, Washington, D. C."